United States Patent
Blue et al.

(10) Patent No.: US 9,930,897 B2
(45) Date of Patent: Apr. 3, 2018

(54) SMOKER OVEN WITH IMPROVED AIR FLOW

(71) Applicant: Southern Pride Distributing, LLC, Alamo, TN (US)

(72) Inventors: Samuel Ralph Blue, Creal Springs, IL (US); Jesse Dewayne Barger, Alamo, TN (US); Christopher Shane Needham, Trenton, TN (US); Rad Jasen Hunsley, Dyersburg, TN (US)

(73) Assignee: Southern Pride Distributing, LLC, Alamo, TN (US)

( * ) Notice: Subject to any disclaimer, the term of this patent is extended or adjusted under 35 U.S.C. 154(b) by 0 days.

(21) Appl. No.: 15/126,950

(22) PCT Filed: May 11, 2015

(86) PCT No.: PCT/US2015/030069
§ 371 (c)(1),
(2) Date: Sep. 16, 2016

(87) PCT Pub. No.: WO2015/175366
PCT Pub. Date: Nov. 19, 2015

(65) Prior Publication Data
US 2017/0094984 A1    Apr. 6, 2017

Related U.S. Application Data

(60) Provisional application No. 61/993,104, filed on May 14, 2014.

(51) Int. Cl.
A23B 4/044    (2006.01)
A23B 4/052    (2006.01)
A47J 37/00    (2006.01)

(52) U.S. Cl.
CPC ............ *A23B 4/052* (2013.01); *A23B 4/0523* (2013.01); *A47J 37/00* (2013.01); *A23B 4/044* (2013.01)

(58) Field of Classification Search
CPC ..... A23B 4/0523; A23B 4/0526; A23B 4/052; A23B 4/044
(Continued)

(56) References Cited

U.S. PATENT DOCUMENTS 3,861,378 A  *  1/1975  Rhoads ................... A21B 1/50
                                                         126/21 A
4,080,437 A      3/1978  Reh et al.
(Continued)

OTHER PUBLICATIONS

PCT International Search Report for International Application No. PCT/US2015/030069 dated Aug. 2015.
(Continued)

*Primary Examiner* — Reginald L Alexander
(74) *Attorney, Agent, or Firm* — Polster Lieder Woodruff Lucchesi, L.C.

(57) ABSTRACT

A solid fuel smoker oven having a cooking chamber and a heat source chamber separated by a vertical divider. The heat source chamber includes a gas fired firebox to burn solid fuel. The cooking chamber comprises air channels defined by perforated wall panels comprising calibrated orifices that vary in size from the top of the channel to the bottom to allow air flow and temperatures inside the cooking chamber to be balanced. A fan in the cooking chamber draws heat and smoke emissions from the firebox and directs them into the air channels and recycles the heated air and smoke through the heat source chamber, which limits heat and smoke escape and maximizes temperature stability inside the oven. The fan also functions as a spark arrestor.

2 Claims, 11 Drawing Sheets

(58) Field of Classification Search
USPC .................. 99/482, 481, 474, 476; 126/21 A
See application file for complete search history.

(56) References Cited

U.S. PATENT DOCUMENTS

| | | | |
|---|---|---|---|
| 4,979,436 A | 12/1990 | McGowan | |
| 5,129,384 A * | 7/1992 | Parks ..................... | A21B 1/44 |
| | | | 126/21 A |
| 5,394,791 A * | 3/1995 | Vallee ..................... | A21B 1/44 |
| | | | 126/21 A |
| 5,529,052 A * | 6/1996 | Sanchez .................. | A21B 1/26 |
| | | | 126/21 A |
| 6,021,709 A * | 2/2000 | Koopman .............. | A21B 1/245 |
| | | | 126/21 A |
| 6,868,777 B1 | 3/2005 | Higgins et al. | |
| 6,880,544 B2 * | 4/2005 | Hegge ..................... | A21B 3/04 |
| | | | 126/20 |
| 7,451,691 B2 | 11/2008 | Robertson | |
| 8,895,902 B2 * | 11/2014 | Shei ..................... | A47J 39/003 |
| | | | 126/21 A |

OTHER PUBLICATIONS

PCT Written Opinion of the International Searching Authority International Application No. PCT/US2015/030069 dated Aug. 5, 2015.

* cited by examiner

SMOKER OVEN WITH IMPROVED AIR FLOW

RELATED APPLICATIONS

This application derives and claims priority from International Application No. PCT/US2015/030069, filed May 11, 2015, and published under International Publication No. WO 2015/175366A1, and from U.S. provisional application Ser. No. 61/993,104, filed May 14, 2014, which is incorporated herein by reference.

BACKGROUND

The invention relates generally to ovens for preparing food products, and more particularly to an oven or smoker.

Food products, for example meats such as beef, pork, and poultry, as well as fish and the like, traditionally are prepared for consumption by subjecting the raw product to sufficient heat so as to cook the product to an appropriate level of doneness. Various ovens or cookers are used for roasting, broiling, smoking or barbequing meat. In many instances, the cookers or ovens used to prepare the product have a cooking chamber and a source of convection heat, for example, electric heating elements, gas jets, wood or charcoal burners. In commercial food preparation, for example in restaurants, large ovens are employed to cook or prepare large quantities of product at one time. For example, large convection ovens or barbeque ovens or smokers are used to prepare batches of food products, such as roasts, ribs, chickens, fish and sometimes potatoes and other vegetables. These products generally are placed on racks inside the cooking chamber and subjected to heat and/or smoke. These commercial ovens, particularly barbeque ovens or smokers, usually impart a unique and desired flavor and quality to the prepared foods.

Most commercial ovens or smokers function well for their intended purposes. However, the commercial ovens or smokers generally are fixtures in a restaurant or other food preparation facility. They are large, heavy and often connected to a source of fuel, such as natural gas and electricity. Also, to be used in a commercial setting, the oven must be installed under a Type 1 commercial ventilation system.

It would be advantageous, therefore, to provide a compact oven or smoker for preparation of food products that provides many of the same cooking features as a larger commercial oven or smoker.

It would be advantageous to provide such a compact smoker oven with a heat and smoke source separate from the cooking chamber.

It also would be advantageous to provide a compact smoker oven with an air flow system for pulling heated air and smoke through the cooking chamber.

SUMMARY OF THE INVENTION

A solid fuel smoker oven incorporating a cooking chamber and a heat source chamber separated by a vertical divider segregating the heat source chamber from the cooking chamber. The heat source chamber includes a self-contained steel firebox with a gas fired burner used to provide heat for cooking as well as to ignite wood or other solid fuel elements used to produce smoke to impart a barbecue flavor to the food. The cooking chamber includes a fan whereby heat and smoke emissions from the firebox are drawn from the heat source chamber into the cooking chamber by a single inlet centrifugal fan.

The cooking chamber comprises air channels defined by perforated wall panels. The emissions are forced through air channels on each side of the cooking chamber. The air channels have calibrated orifices that vary in size from the top of the channels to the bottom which allow the air flow and temperature inside the cooking chamber to be balanced from top to bottom and side to side.

In one aspect, the orifice sizes ranges from about 0.75 inch diameter to about 0.375 inch diameter.

In one aspect, the centrifugal fan functions as a spark arrestor.

The cooking chamber incorporates a vent tube or flue that extends through the top wall of the oven exposing the cooking chamber to the ambient atmosphere. This vent prevents pressure from building inside the cooking chamber and allows some combustion exhaust to be emitted so proper burner function can be maintained.

The lower portion of the partition wall separating the cooking chamber form the heat source chamber is open allowing the smoke and heated air to be drawn back into the heat chamber, where the emissions are reheated over the firebox, and recirculated to the cooking chamber via the constant draw of the single inlet centrifugal fan.

The oven design incorporates multiple rack positions that allow low profile products to be placed closely together and product racks to be spaced further apart for taller/higher profile products.

The oven is constructed of stainless steel panels that comprise a box-like structure. The four side walls and the top of the oven chambers are composed of inner and outer layers of steel with a thermal insulating material between the two layers of steel. The bottom wall of the oven is constructed of a single wall stainless steel sheet with a drain hole to allow rendered by-product from the cooked product to drain from the cooking chamber into a drain pan.

In another aspect, the back wall of the oven may be equipped with a second product door into the cooking chamber that allows loading and unloading of product into the cooking chamber from both the front and back sides of the oven. This is commonly referred to as a pass through design.

Additionally the oven may be equipped with a water reservoir and heating elements mounted to the bottom wall of the oven in the cooking chamber to allow for the production of steam into the cooking chamber during a cook cycle. Access to the heat elements for the steam source is obtained through the access panel located on the lower section of the back wall on the cooking chamber side.

DETAILED DESCRIPTION

Figure 1A:
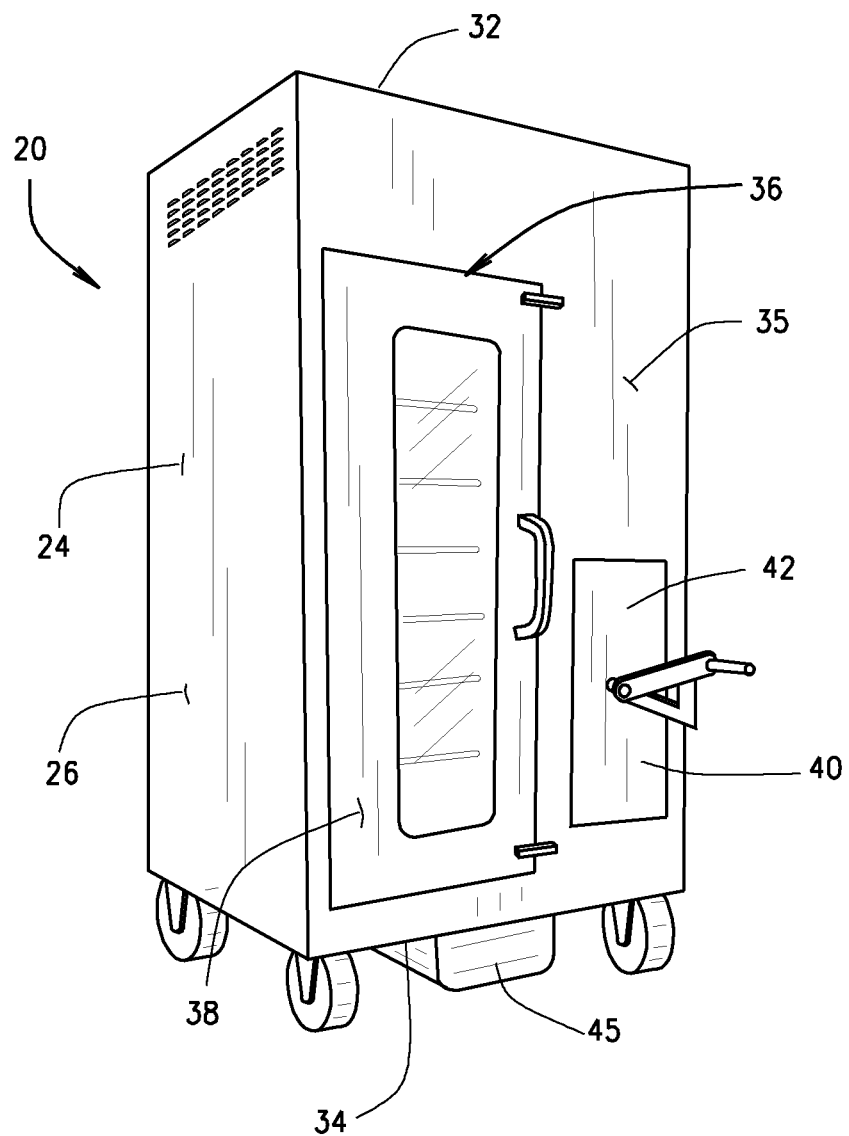
FIG. 1A is a front perspective view of an aspect of a smoker oven.

The following is a detailed description of preferred aspects of the present invention including the best mode of carrying out the invention presently known to the inventor.

One aspect of the oven is indicated generally be reference numeral 20 in the figures. Oven 20 is designed to prepare food products, generally by cooking with heat or flavored smoke or combination thereof. A source of steam, such as a fluid reservoir, or a source of flavored smoke in the cooking chamber may be employed as well. The terms "food products" or "food product" is intended to include commonly prepared meats including, but not limited to, beef, pork, poultry, lamb, wild game, as well as fish or other seafood. The terms "food products" or "food product" also can include vegetables, such as ears of corn, potatoes, onions or any other product that may be prepared by one of heat, steam, flavored smoke, or any combination thereof. In other words, the terms "food products" and "food product" is intended to encompass any items prepared in the oven.

As shown, oven 20 includes a cabinet 24 having a first side wall 26, an opposite side wall 28, a back wall 30, a top wall 32 and a bottom wall 34. The cabinet includes a front wall 35 with an opening 36 on one side sealable by an insulated, hinged door 38. The other side of front wall 35 defines an opening 40 into a firebox 42 adjacent the bottom of the wall. The recited front, back, side and top walls comprise inner and outer layers of steel with a thermal insulating material 43 between the layers. The bottom wall is constructed from single wall stainless steel sheet with the drain hole 44 therein. A collection or drain pan 45 is positioned below the drain hole to collect drippings or waste. The cabinet includes casters 46 under the bottom four corners.

The recited walls define an interior chamber 47 divided by partition 48 into an internal food preparation or cooking chamber 50 and heat and smoke chamber 52. The lower part 53 of partition 48 wall is open.

Heat and smoke chamber 52 is further divided into an upper heat and smoke chamber 54 and firebox 42.

Figure 1B:
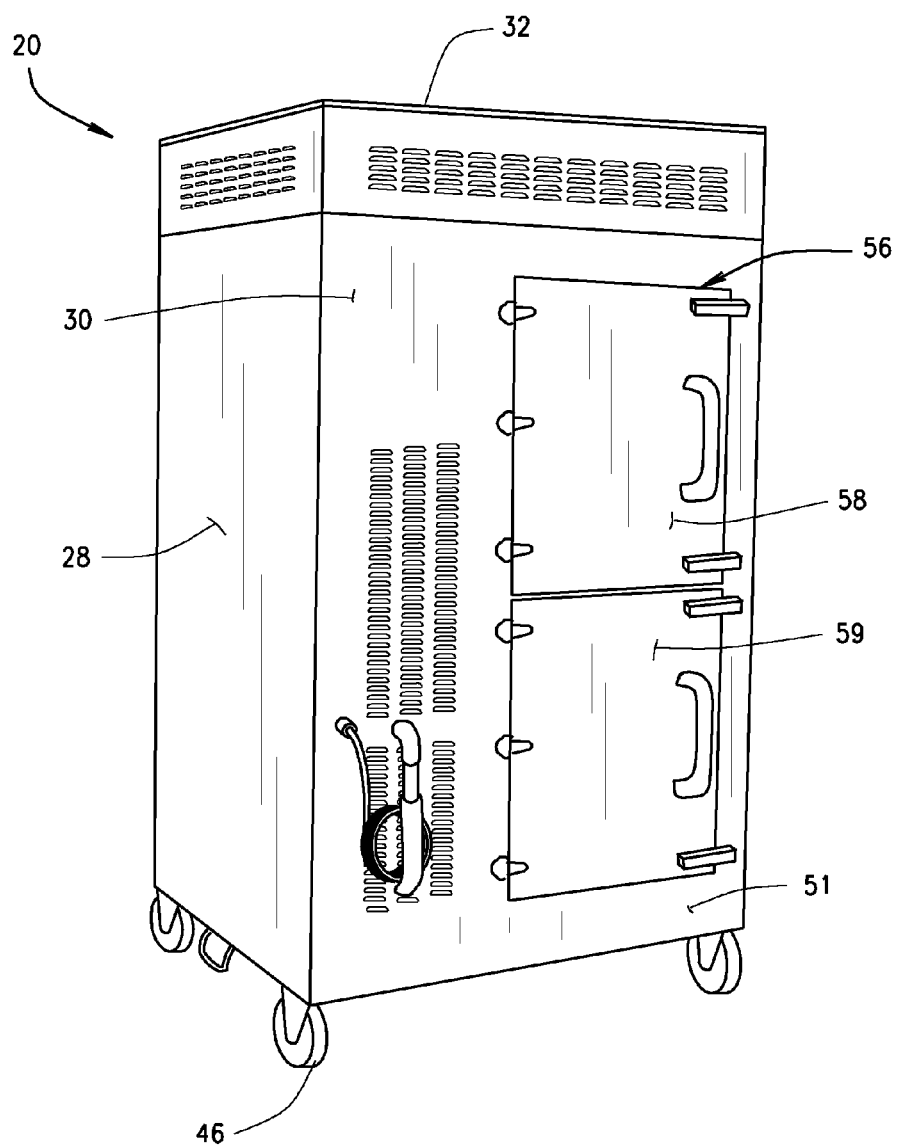
FIG. 1B is a rear perspective view of a smoker oven.
Figure 2:
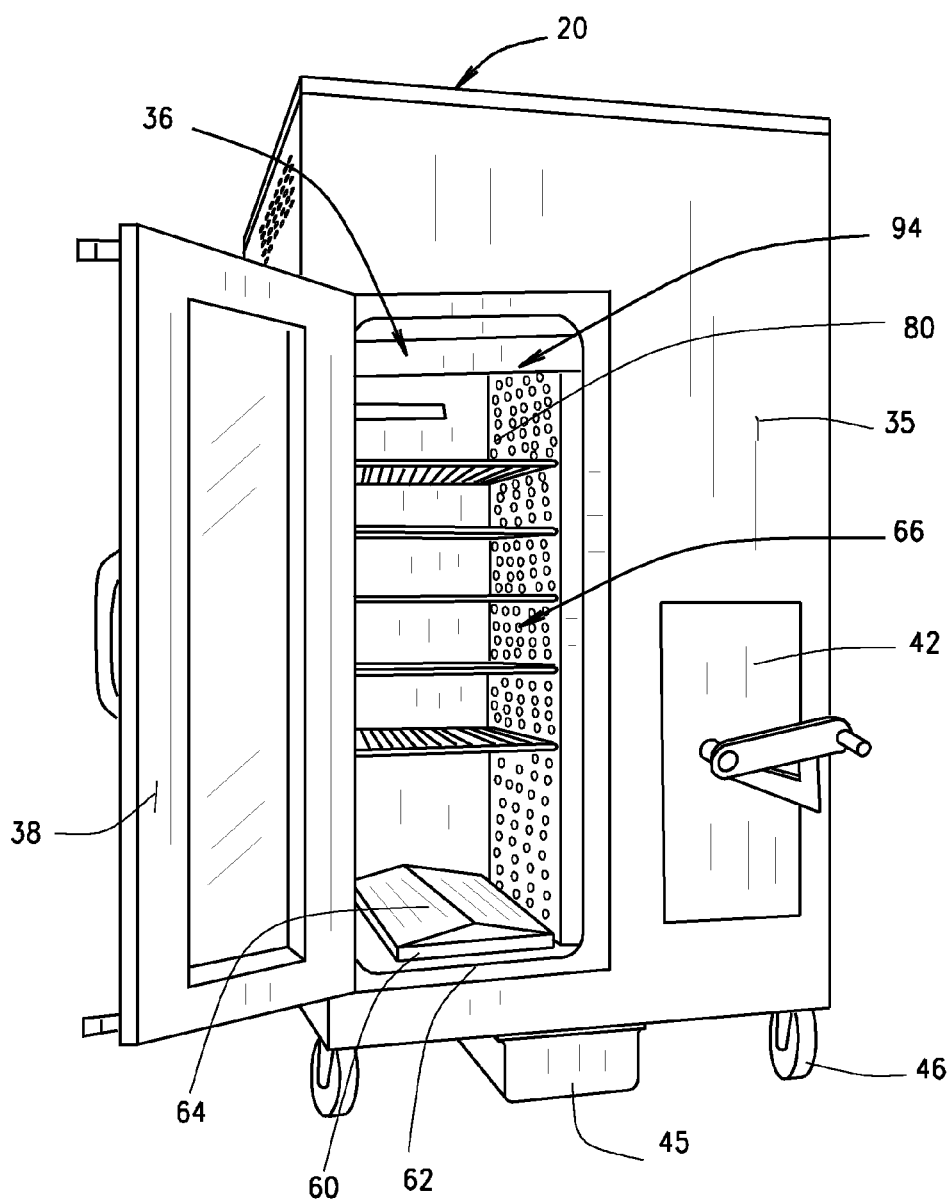
FIG. 2 is a front plan view of a smoker oven with the cooking chamber door open.

In one aspect, door 38 includes a glass front panel that allows observation of food in cooking chamber 50. As seen in FIG. 1B, back wall 30 defines wall panel 51 and an opening 56 into cooking chamber 50. Generally there is a pass through door covering opening 56. It can be a conventional hinged door or, as shown in the drawing, an optional two door arrangement including an upper insulated, hinged door 58 and a lower insulated, hinged door 59 at opening 56. The use of two doors allows attention to racks of food at the top or the bottom without having the entire opening 56 exposed. The aspect of oven 20 comprising a front door and back door is referred to as a pass through design which allows loading and unloading for the cooking chamber from the front or back.

In another aspect, there is an optional steam generating apparatus 60 in cooking chamber 50 on the bottom wall. Steam generating apparatus 60 may comprise a water pan 62 with an internal heat source, such as an electric heating coil or bar type heating elements (not seen) inserted into pan 62 through back wall 30. There is a drip deflector 64 positioned over pan 62.

The interior facades of side walls 26 and 28 of cooking chamber 50 include removable, perforated panels 66. Panels 66 include a face panel 68 and shorter, end panels 70 positioned at right angles to the face panel. When panel 66 is attached to the interior surface of a side wall, the panel and wall define a heat and smoke channel 72. Panel 66 defines a plurality of orifices 74. Orifices 74 are sized and positioned to optimize heat and smoke emissions from channel 72 into cooking chamber 50. For example, orifices 74 may be positioned such that smoke and heat emitted through the openings are directed toward racks of food product, as will be explained.

Optimum uniform heat distribution throughout the cooking chamber occurs with orifices 74 at the top of the cooking chamber are larger in diameter than those at the bottom of the cooking chamber. By way of example, in one aspect, heat distribution is optimized by a reduction of orifice diameter of fifty percent (50%) from the top of the cooking chamber to the bottom. In one aspect, an optimum diameter for orifices 74 ranges from about 0.375 inch to about 0.75 inch. More particularly, by way of example, one aspect that performs well provides are orifices 74 at the top of the cooking chamber of about 0.75 inch in diameter that decrease down the vertical height of the perforated panels to about 0.375 inch in diameter at the bottom. In such an embodiment, orifices in between may be of diameters between about 0.75 inch and about 0.375 inch.

Figure 5:
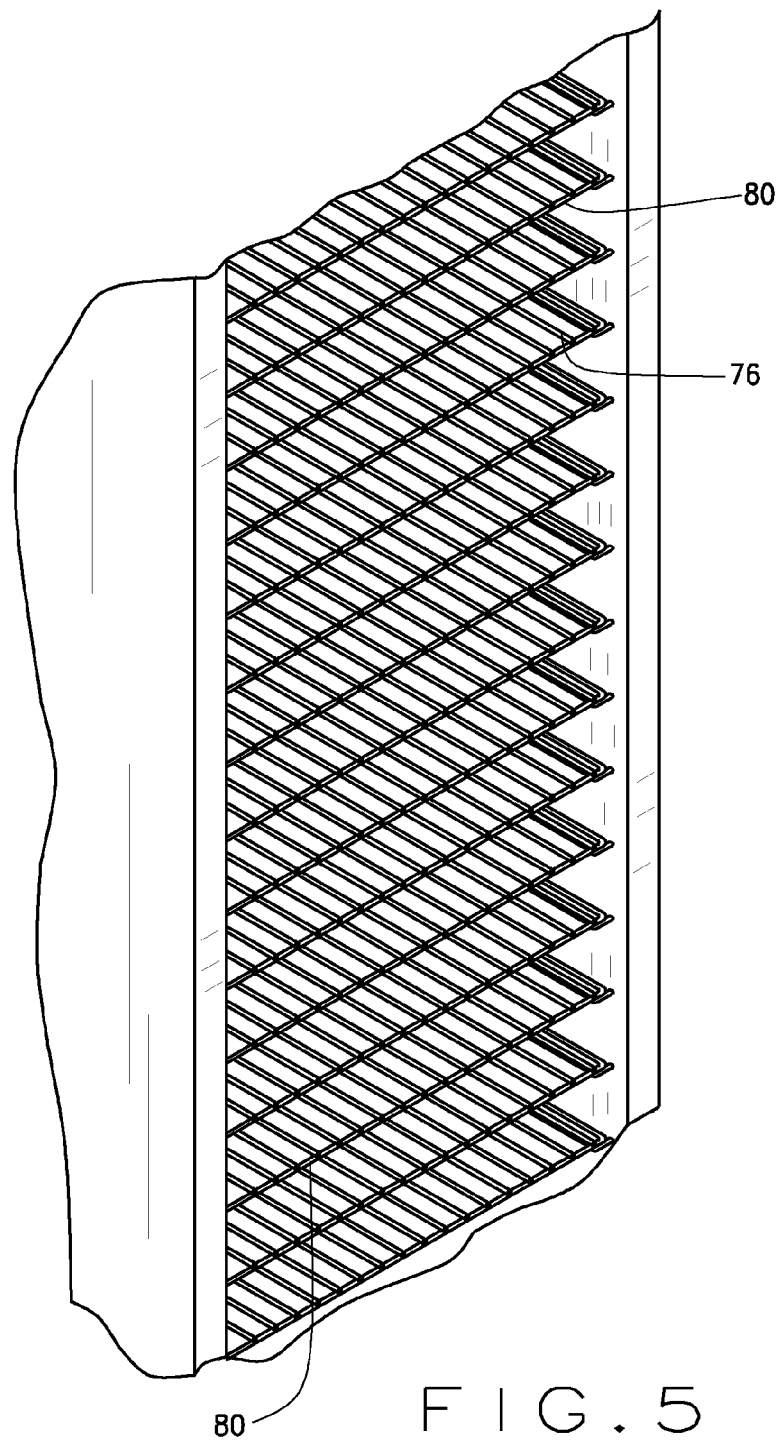
FIG. 5 is a front perspective view of a cooking chamber with an array of racks.
Figure 6:
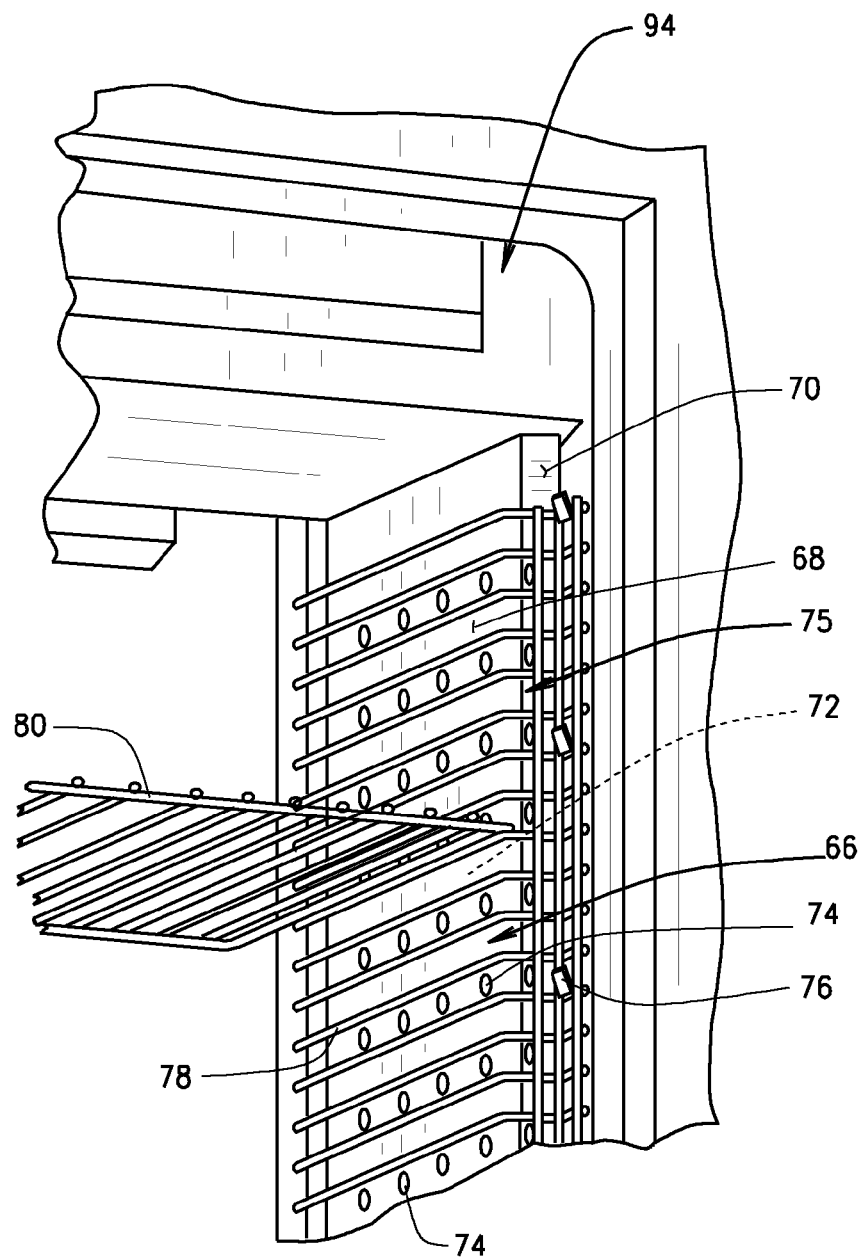
FIG. 6 is a front perspective view of one side of the cooking chamber illustrating rack supports and perforated wall panels.
Figure 7:
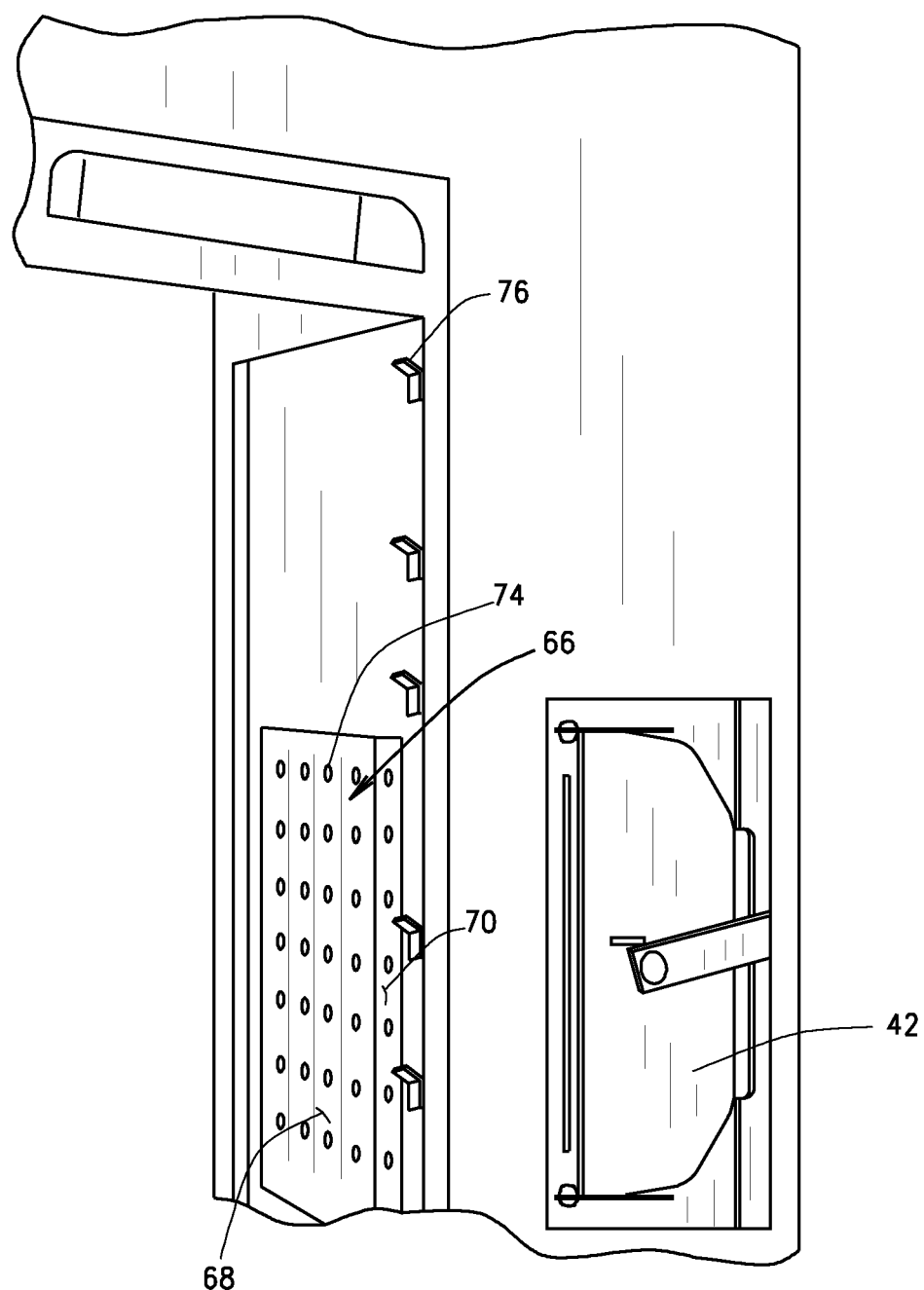
FIG. 7 is a front perspective view of one side of the cooking chamber with the rack supports and a perforated wall panel removed.

As seen in FIGS. 5 and 6, cage-like rack hangers 75 are secured on hooks 76 protruding from the side walls. Rack hangers 75 are positioned over panels 66 and comprise heavy wires 78 extending laterally along the side walls. As seen, any number of racks 80 can be suspended between the rack hangers and in any desired configuration. As best seen in FIG. 5, each rack 80 is adjacent a row of orifices 74 such that heat and smoke emitted through orifices 74, as explained below, are directed across any food products on the rack. In one aspect, smoker over 20 incorporates multiple rack positions that allow low profile products to be placed closely together and product racks to be spaced further apart for taller/higher profile products.

There is a flue 81 that extends through top wall 32 at a rear corner of the cabinet. Flue 81 allows grease laden vapors, heat and smoke to escape so the cooking chamber does not build up pressure. Flue 81 is constructed and dimensioned so that it does not allow too much heat and air to escape and to help maintain desired temperatures within the cooking chamber. Furthermore, the lower end of flue 81 can terminate near the bottom of the cooking chamber so that it vents the coolest air and also serve as a spark arrestor.

Figure 3:
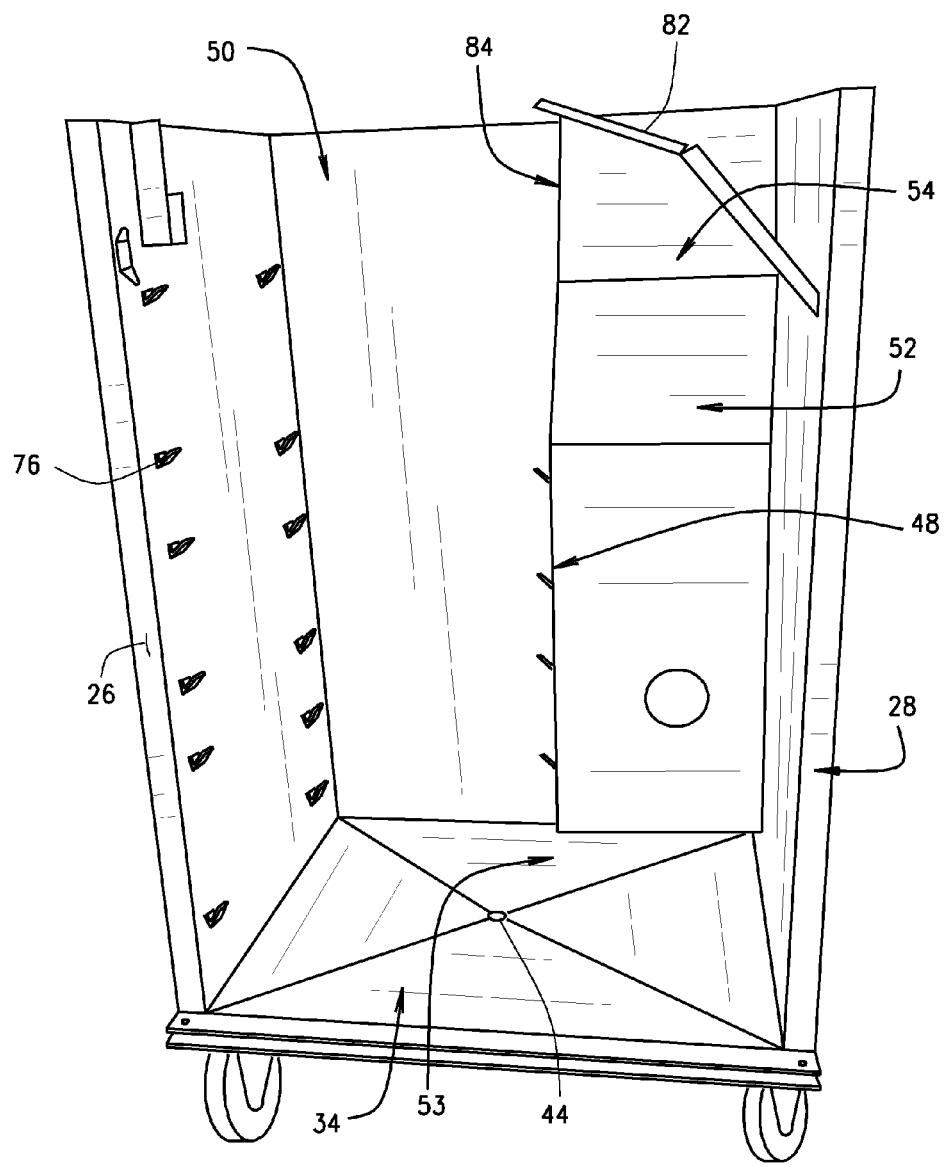
FIG. 3 is a front plan view of the interior of the cabinet.
Figure 4:
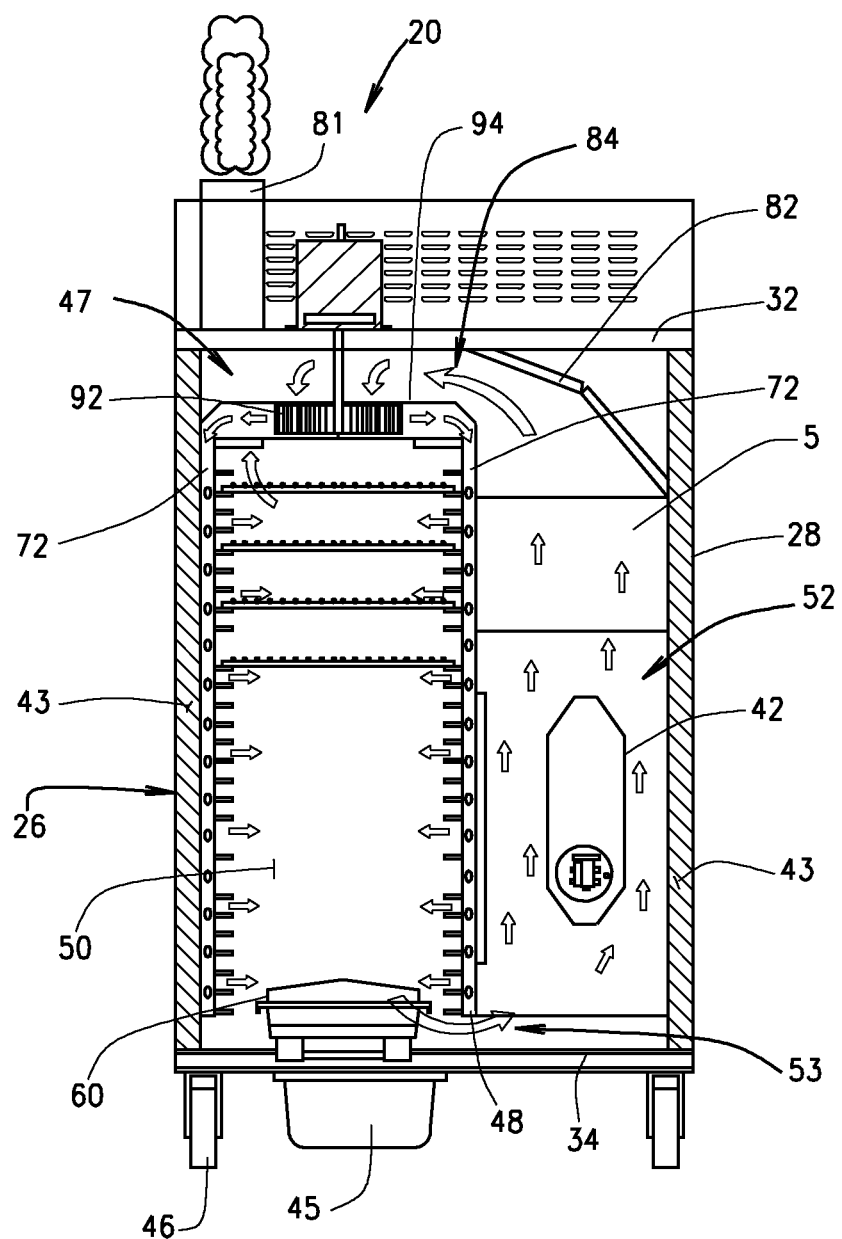
FIG. 4 is a front schematic view of the interior of a smoker oven.

Heat and smoke chamber 52 is best seen in FIGS. 3 and 4 and comprises upper heat and smoke chamber 54, which functions as a plenum and firebox 42. As seen, the upper end of chamber 54 includes a curved baffle 82. Baffle 82 is disposed to direct heat and smoke from heat and smoke chamber 52 through duct 84 between cooking chamber 50 and heat and smoke chamber 52.

Figure 8:
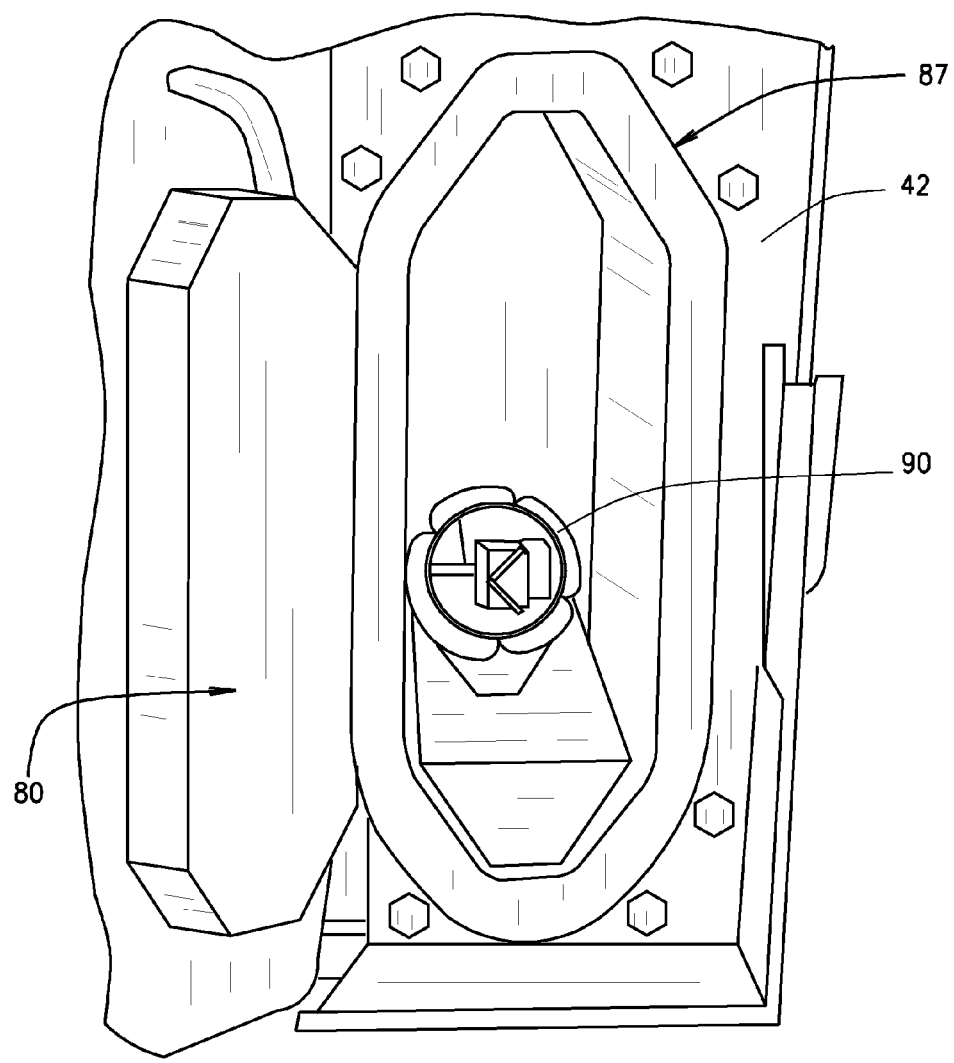
FIG. 8 is a front plan view of a firebox.
Figure 9:
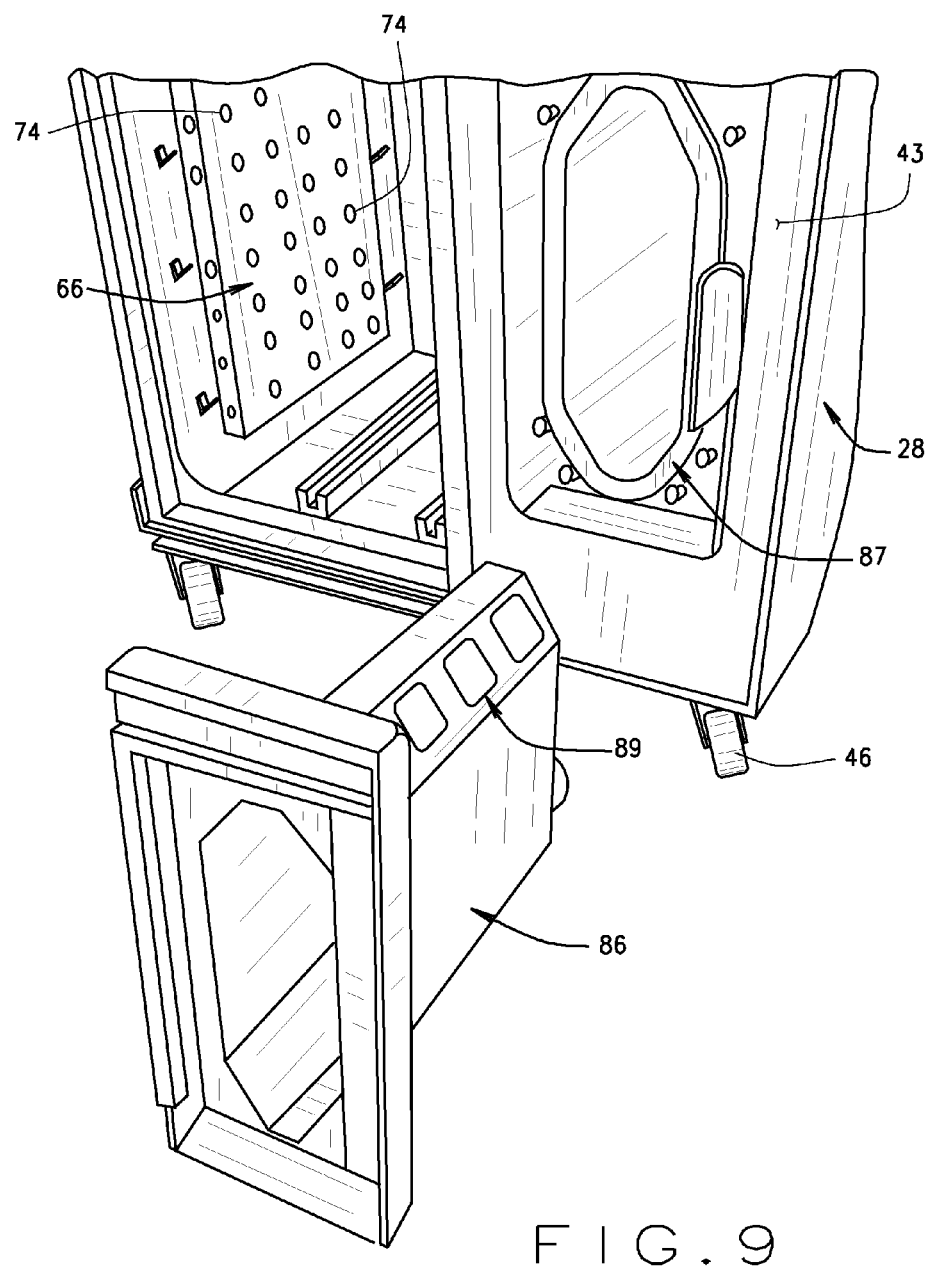
FIG. 9 is a perspective view of the firebox removed from the cabinet.

Firebox 42, illustrated in FIGS. 8 and 9 is positioned in the lower section of heat and smoke chamber 52. Firebox 42 generally is constructed from heavy gauge steel and comprises a box 86 and an opening 87 into the box. The opening into box is sealed by an insulated door 88. Box 86 includes a plurality of openings 89 in the top to allow escape of heat and smoke. As seen in FIG. 8, there is a gas jet 90 positioned in the back wall. Solid fuel, such as wood, is placed in box 86 and ignited by gas jet 90. The burning fuel generates heat to cook the food products in the cooking chamber, as will now be explained.

Figure 10:
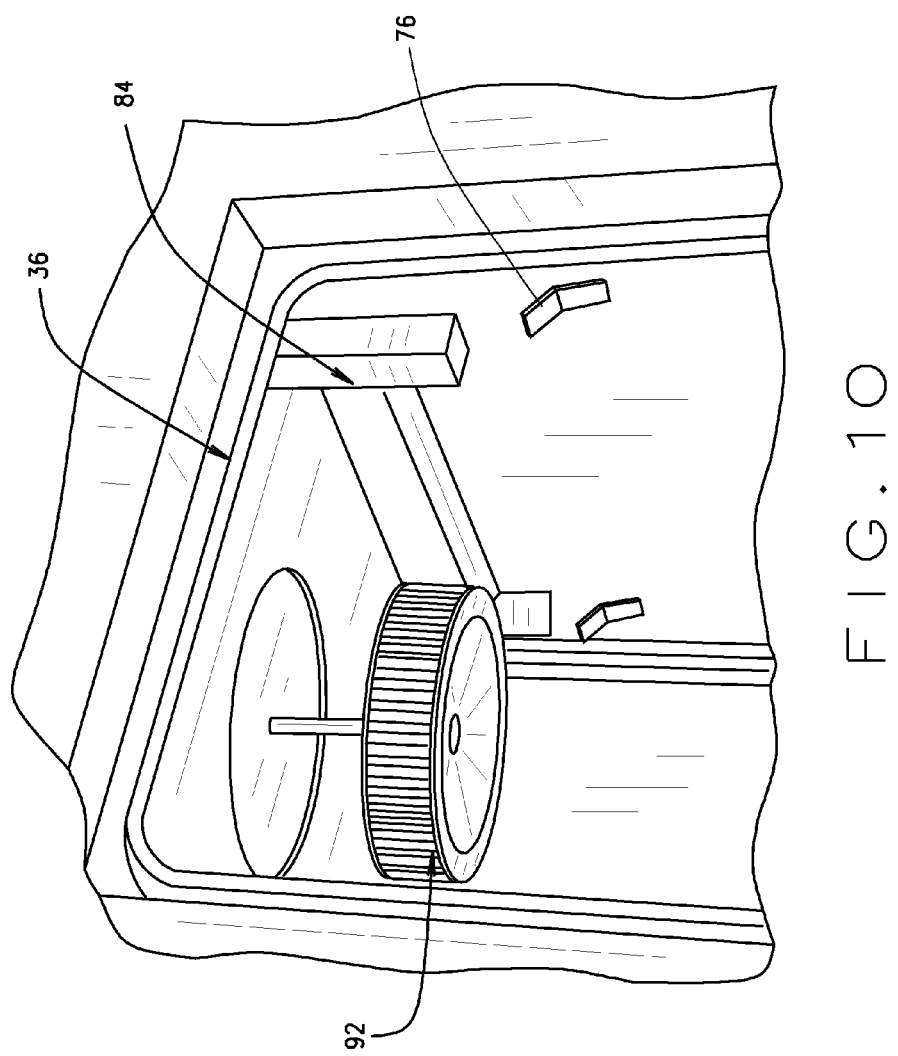
FIG. 10 is a front perspective view of a circulation fan, sans fan shroud.

As seen in FIGS. 4 and 10, there is a convection fan 92 at the top of cooking chamber 50. In use, fan 92 is covered by a shroud 94. Fan 92 and shroud 94 are positioned adjacent to, and are in fluid communication with, the outlet of duct 84. Shroud 94 extends laterally and downwardly over smoke channels 72. In operation, fan 92 draws heat and smoke from heat and smoke chamber 52, through duct 84 and down into channels 72. The heat and smoke egress into the cook chamber through orifices 74 to racks 80 and the food products thereon. All heat and smoke must follow this path into the cooking chamber. Hence, approximately 100% of the heat and smoke generated enters the cooking chamber.

In one aspect fan 92 operates at about 1700 to about 1800 rpm, more preferably about 1750 rpm and most preferably about 1740 rpm. The fan creates a strong suction from the bottom of cooking chamber 50 through heat and smoke chamber 52 where it is reheated. The velocity by which air flow is circulated and recirculated through smoker over 20 restricts heat and smoke from escaping from cooking chamber 50 when product doors are opened. Hence, the airflow design of smoker oven 20 provides the high heat retention. When the doors are open for loading and unloading of product the recovery time to get the smoker oven back to the cook temperature set point is a fraction of the time required by prior art smoker ovens.

Moreover, fan 92 and shroud 94 also function as a centrifugal spark arrestor. Any live embers or sparks emitted by firebox 42 are captured in the fan and shroud or are directed downwardly in the cooking chamber such that they are either extinguished or cooled below an ignition point if they escape through flue.

It will be understood smoker oven 20 can incorporate an appropriate controller to operate and monitor the functions of the oven. Such electronics are generally known to the art. One particularly useful controller is disclosed in U.S. Pat. No. 7,451,691, which is incorporated herein by reference. In operation, the operator can place a desired number of racks 80 in cooking chamber 50. If the recipe calls for steam, water is added to steam generating apparatus 60. Food product can be loaded in the cooking chamber from the front or the rear. Smoker oven 20 is programmed for a cooking temperature and cook time appropriate for the specific food product. Solid fuel, such as wood, is loaded in firebox 42 and ignited with a gas flame. As the fuel burns, heat and smoke is generated and rise into plenum 54. Fan 92 is actuated and draws the heat and smoke through duct 84. Shroud 94 directs the heat and smoke into channels 72. The heat and smoke is emitted through orifices 74 toward the racks and food products. The decreasing diameter of orifices 74 from top to bottom provide for optimum heat distribution throughout the cooking chamber. Because the lower portion 53 of partition 48 separating cooking chamber 50 form the heat and smoke chamber 52 is open, it allows the smoke and heated air to be drawn back into the heat and smoke chamber, where the emissions are reheated over the firebox, and recirculated to the cooking chamber via the constant draw of the single inlet centrifugal fan.

It will be understood that expose elements of the smoker oven, for example, walls, panels 66, rack hangers 75 and racks 80 are all constructed from stainless steel or other material that is readily cleaned. These elements can be removed from the cabinet and properly cleaned after use.

It will be appreciated from the foregoing that various changes and modifications may be made in the mobile oven of the present invention without departing from the scope of the invention. Therefore, the foregoing description and accompany figures should be viewed as illustrative only and should not be construed in a limiting sense.

The invention claimed is:

1. A solid fuel smoker oven for the preparation of food products, comprising:
   a cabinet having a first side wall, a second side wall, a front wall and a rear wall, said walls defining a cooking chamber and a heat source chamber;
   an access door in the front wall;
   a flue at or near the top of the cooking chamber;
   a vertical divider between the recited chambers defining at least one lower opening between the heat source chamber and the cooking chamber;
   a fan within and adjacent or at the top of the cooking chamber;
   a deflector at the top of the heat source chamber disposed toward at least one upper opening between the heat source chamber and the cooking chamber;
   a shroud around the fan, said shroud being in fluid communication with the at least one opening between the heat source chamber and the cooking chamber, said shroud also being in fluid communication with the at least one air channel;
   at least two air flow channels, one each on an inside wall of the cooking chamber defined by perforated wall panels, said perforations being of variable diameters from the top of the channel to the bottom of the channel;
   a firebox in the heat source chamber; and
   a controller to operate and monitor the functions of the oven;
   wherein the fan is configured to draw heat and smoke emissions from the firebox into the shroud and to force the air and smoke downwardly away from the flue into the air flow channels through the perforated wall panels, and into the cooking chamber and to recycle the heated air and smoke through the heat source chamber, which maximizes temperature stability inside the oven and by forcing the air and smoke downwardly and away from the flue, also functions as a spark arrestor.

2. The smoker oven of claim 1 wherein the access door in the front wall comprises a glass panel.

* * * * *